C. G. HAWLEY & E. K. BAKER.
PNEUMATIC TIRE MOUNTING.
APPLICATION FILED FEB. 13, 1909.
1,142,516.
Patented June 8, 1915.
8 SHEETS—SHEET 1.
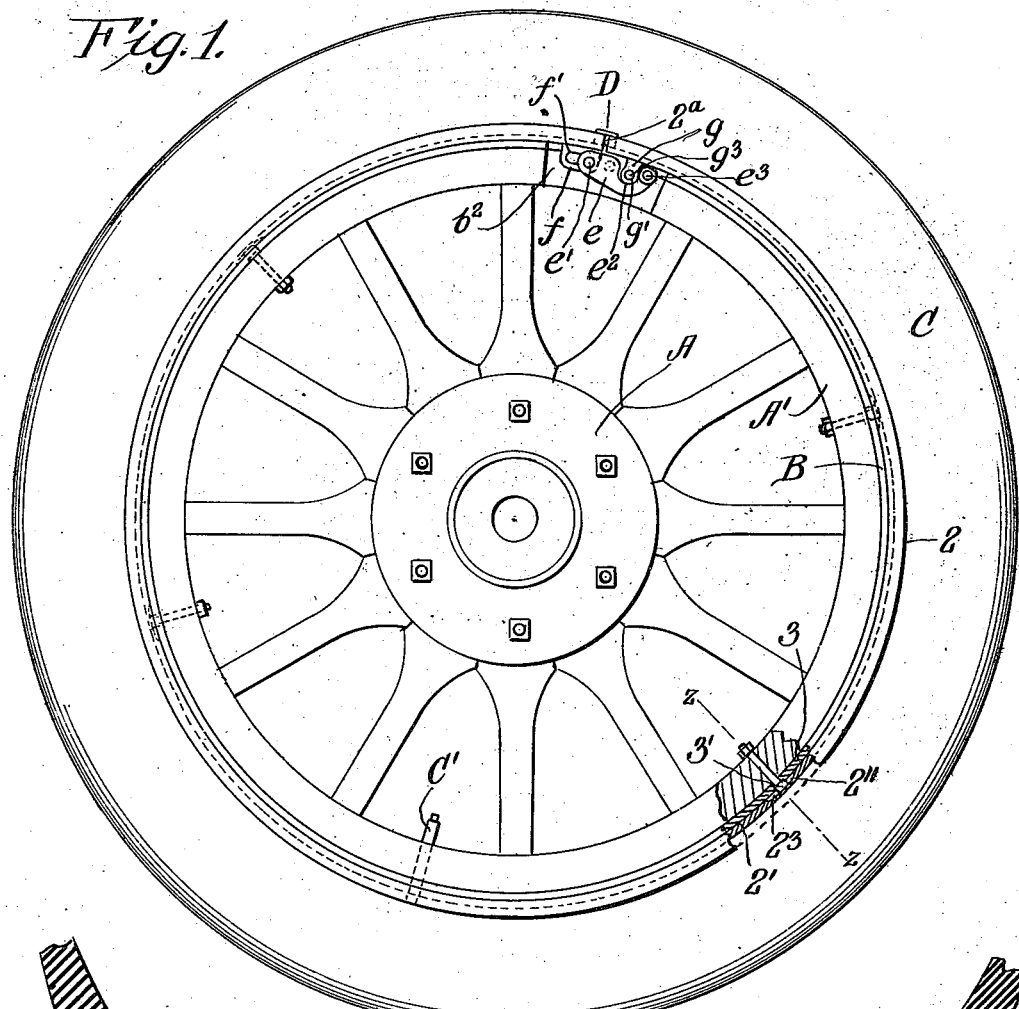
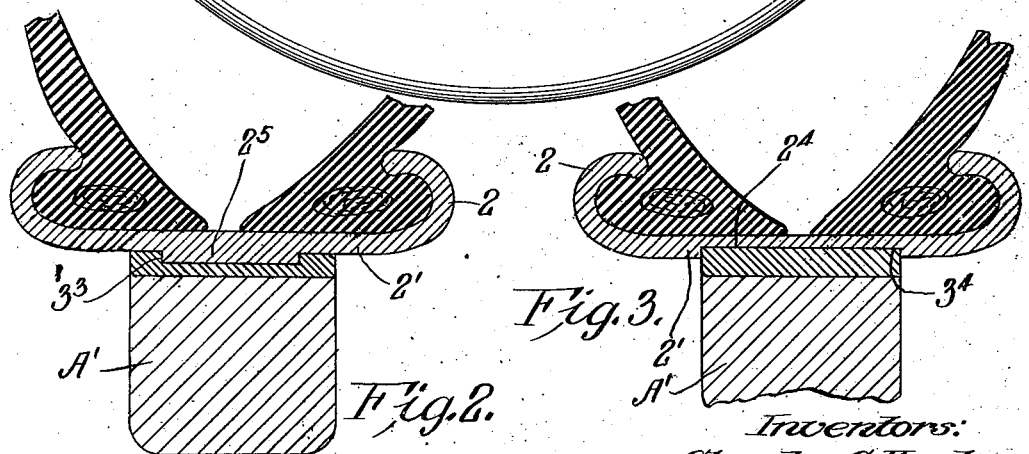

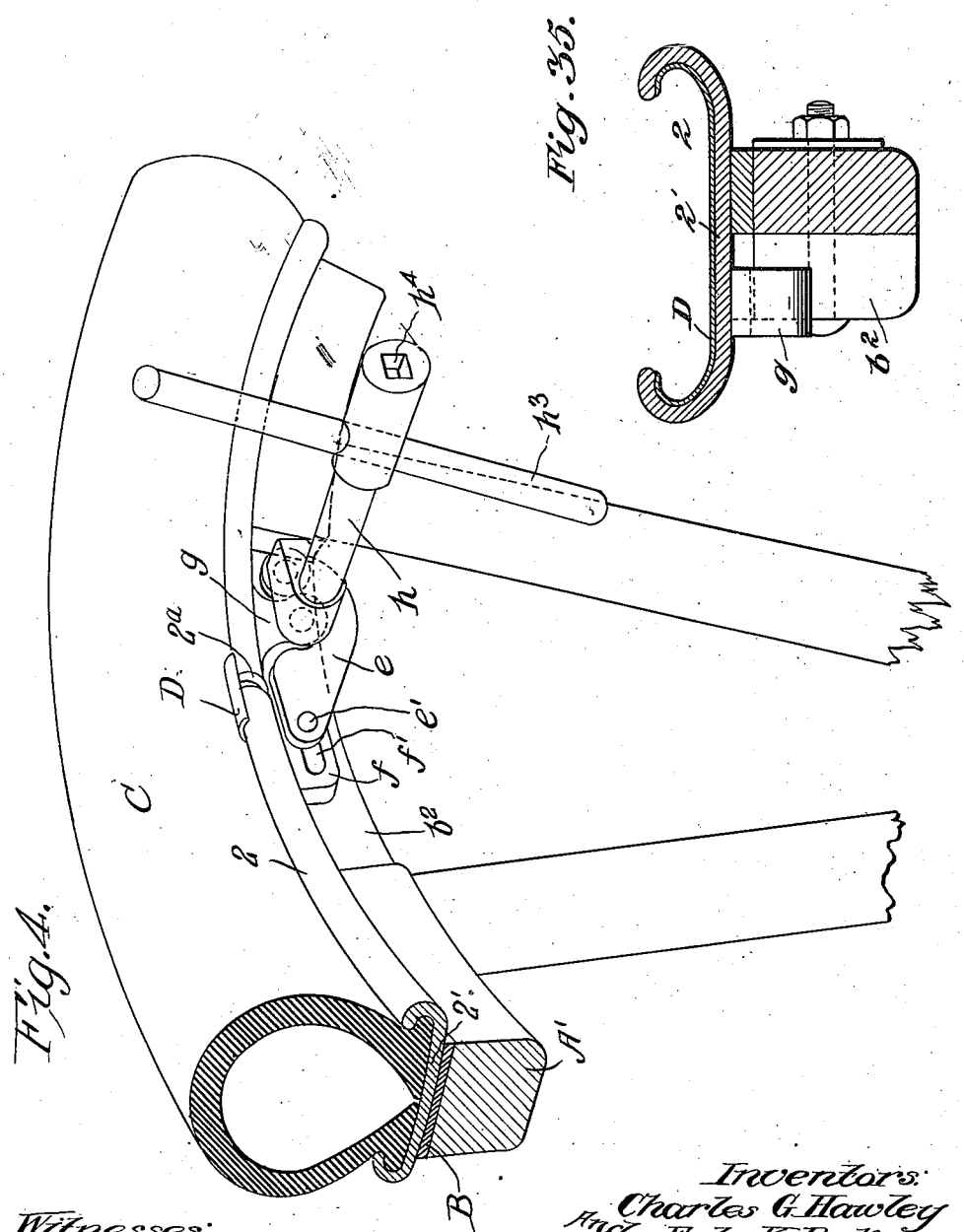

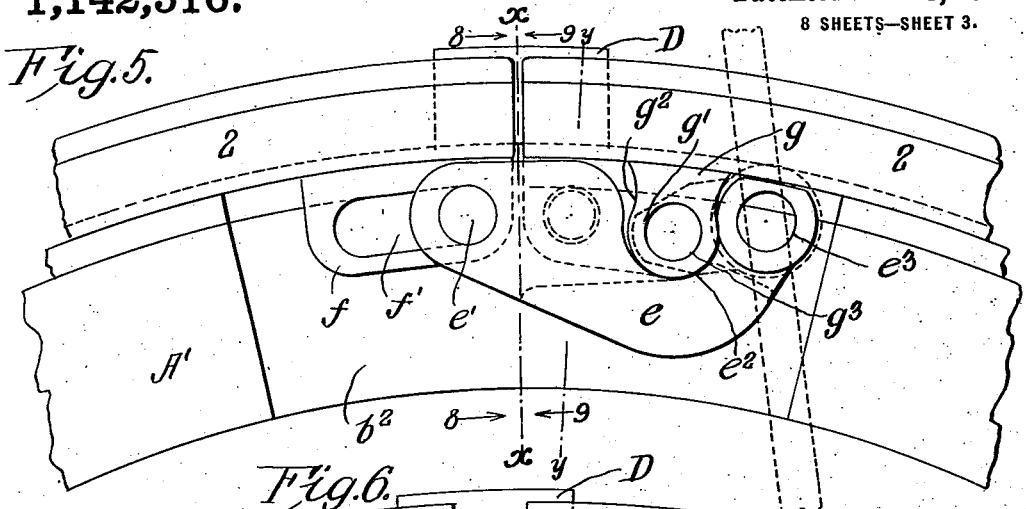
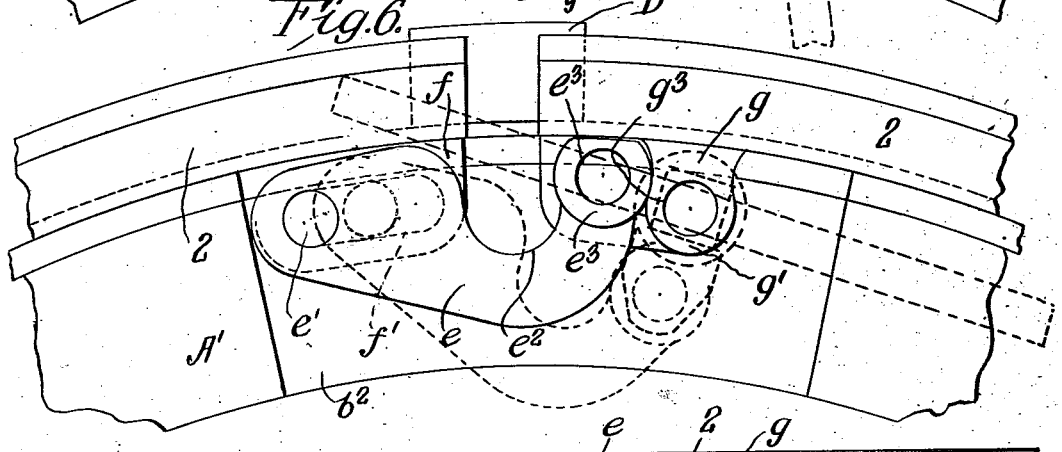
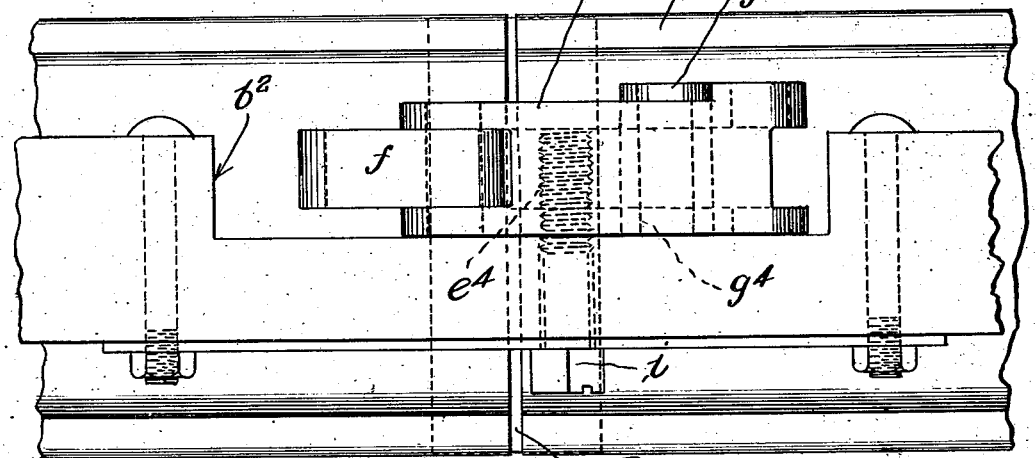

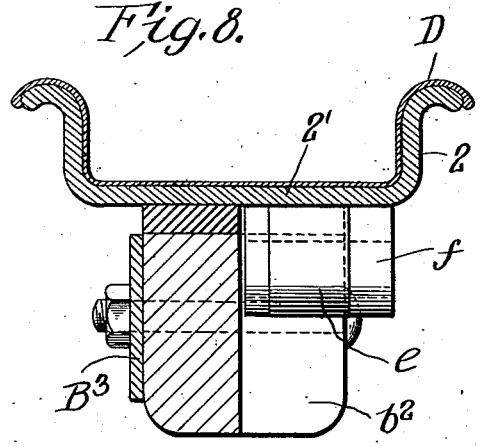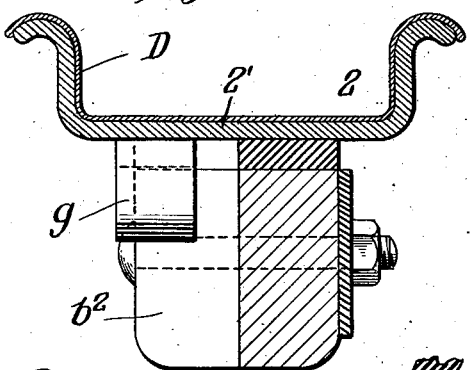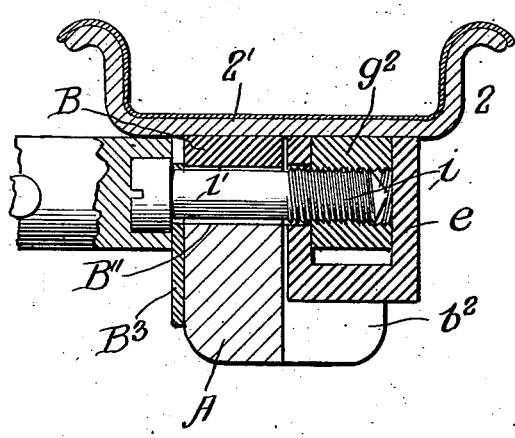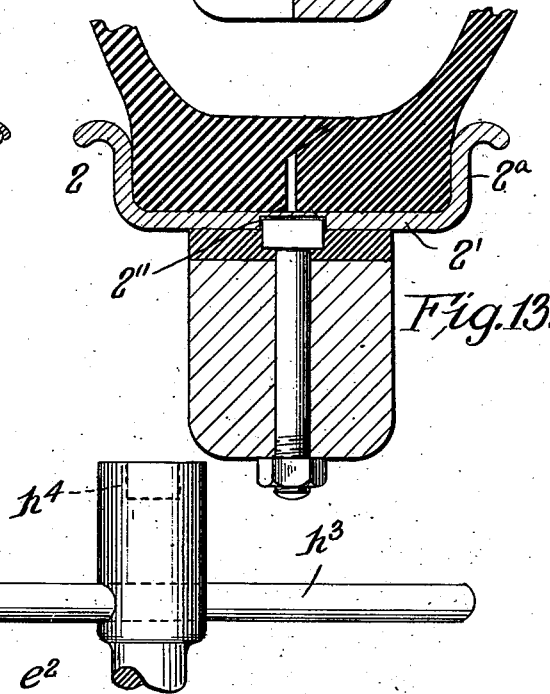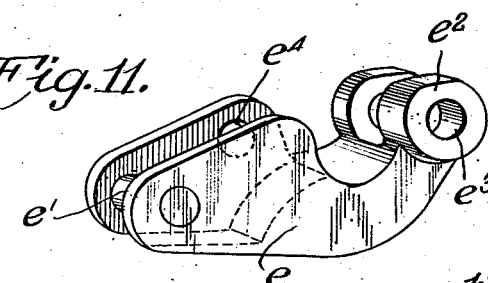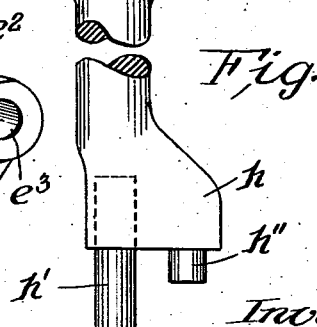

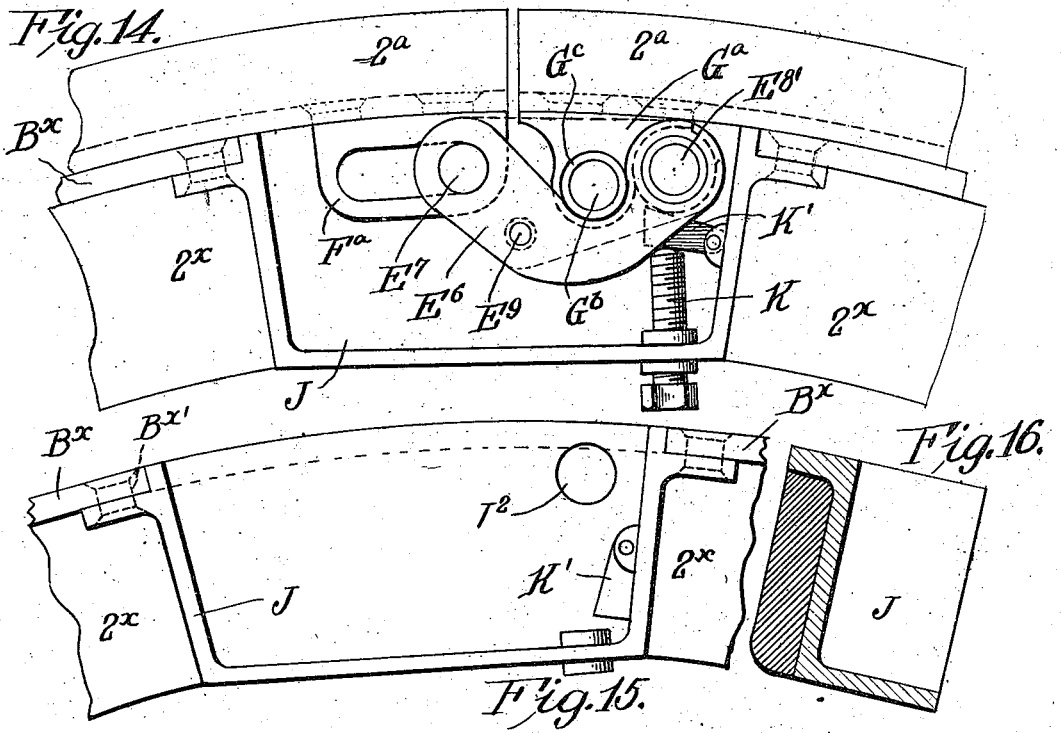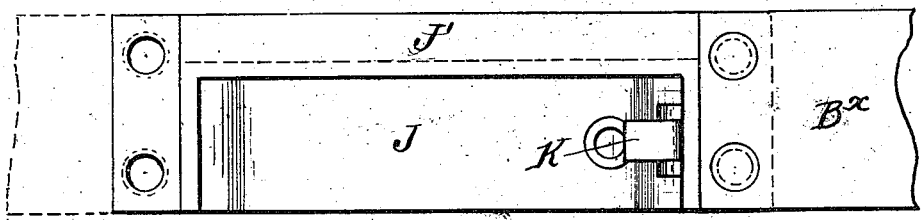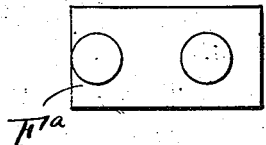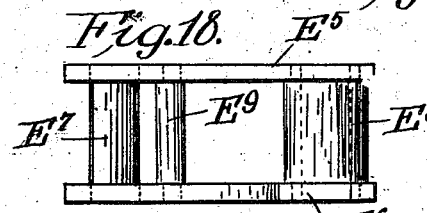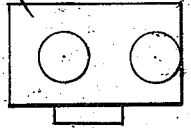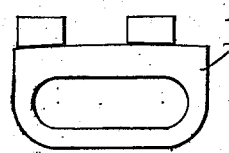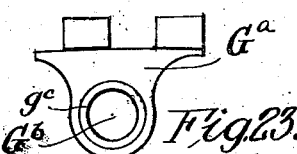

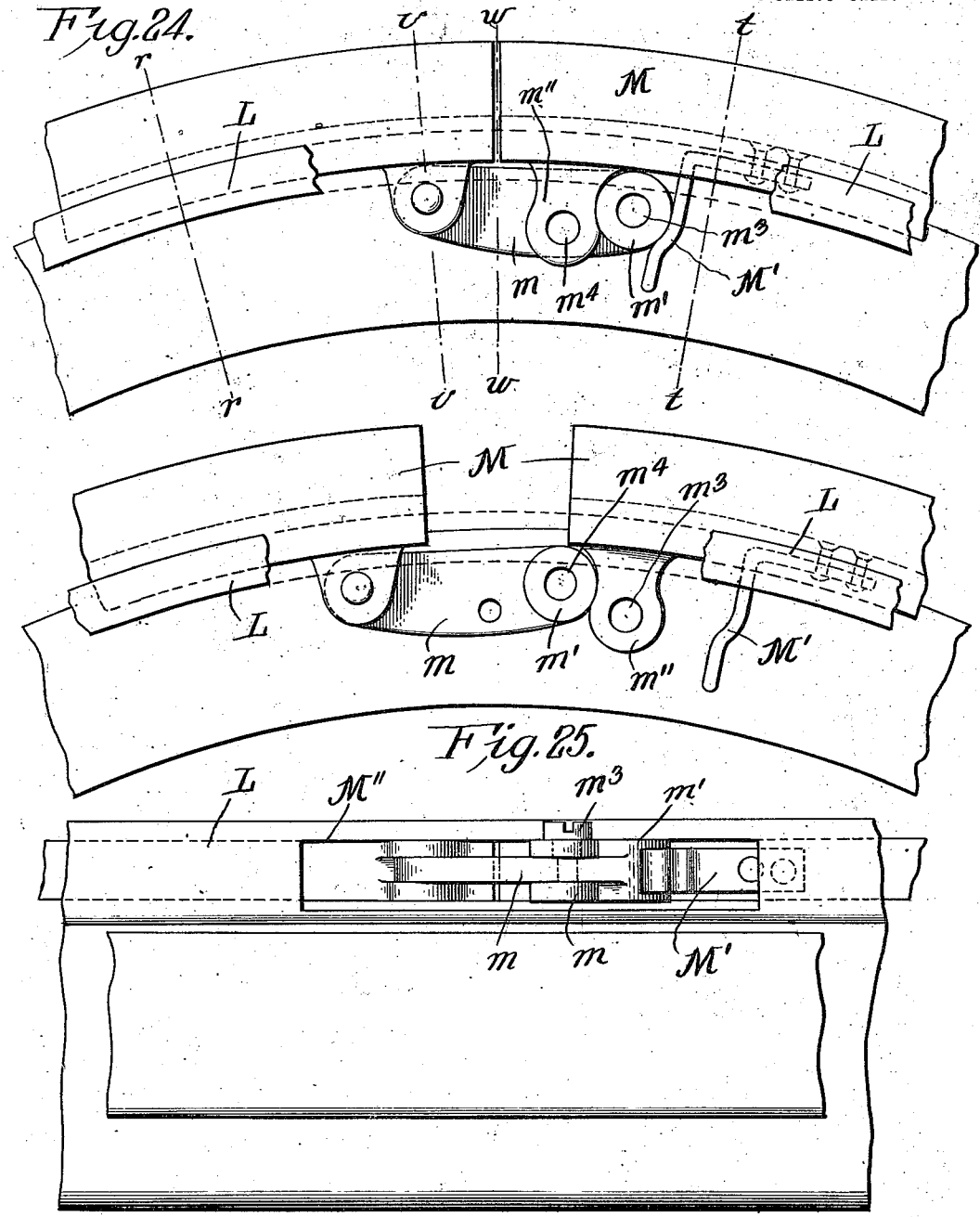

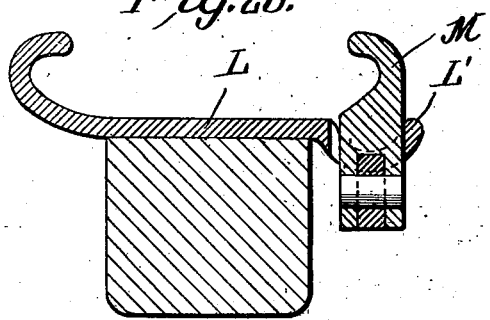
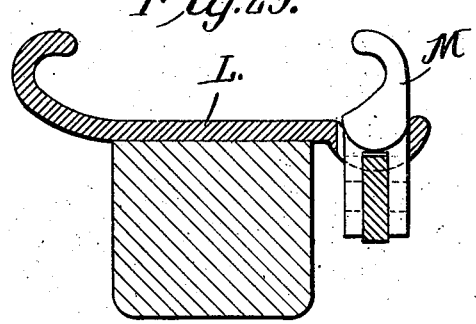
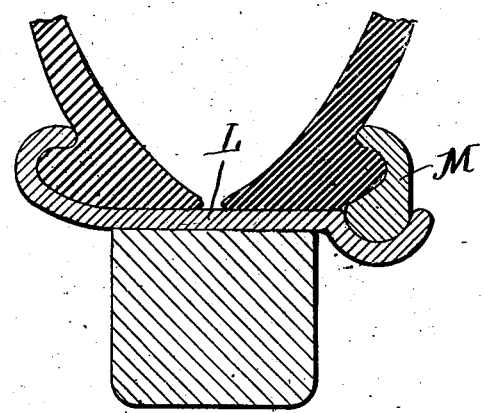
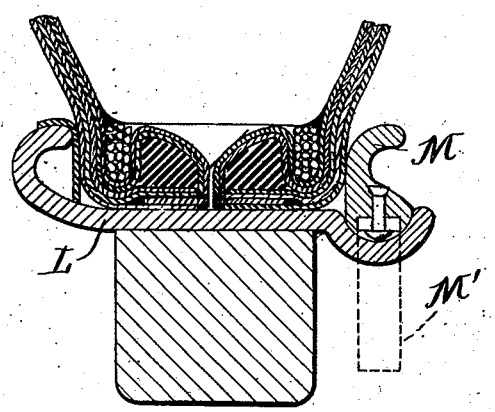
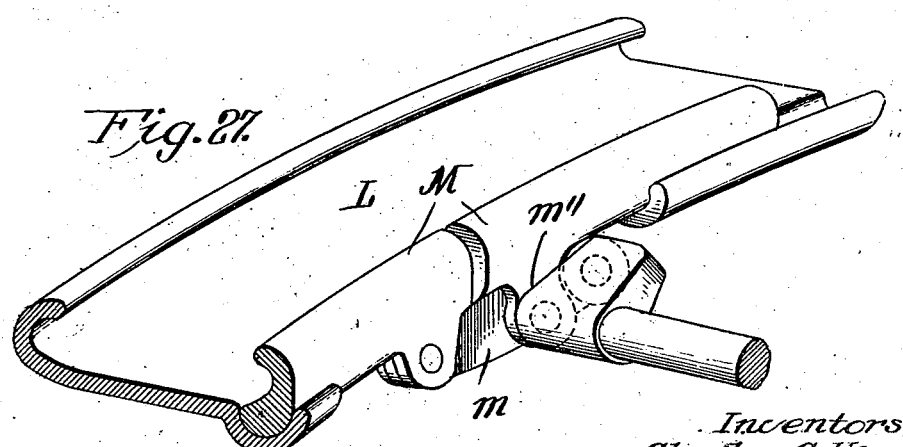

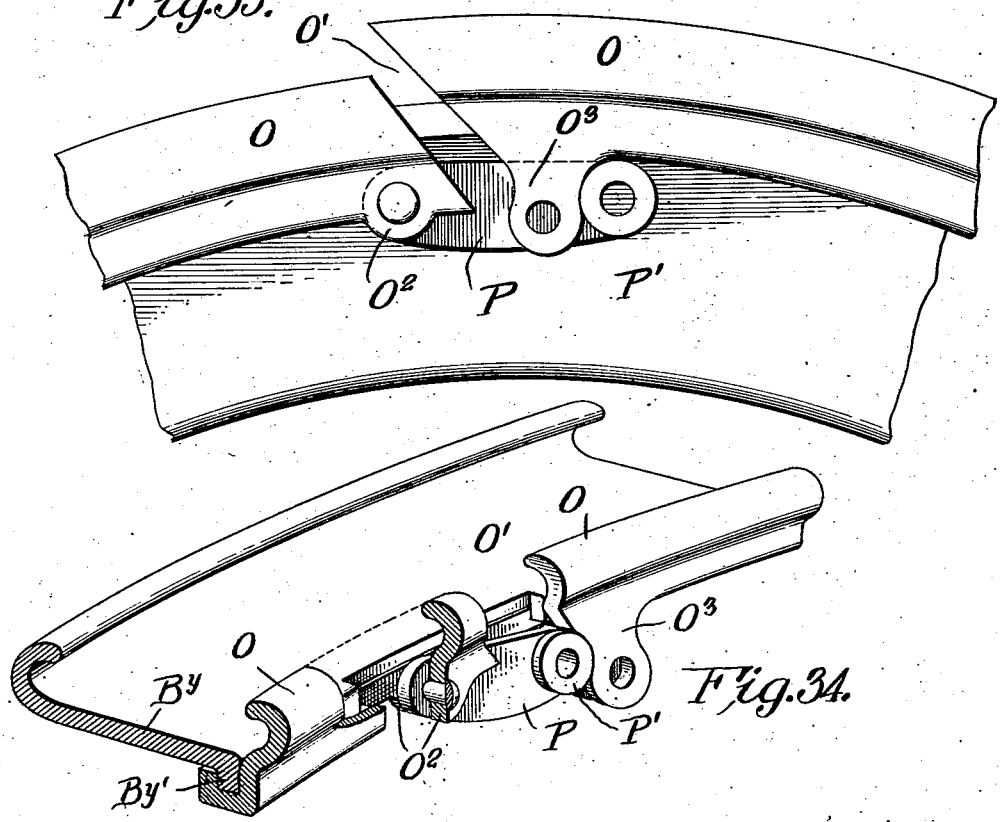

UNITED STATES PATENT OFFICE.

CHARLES GILBERT HAWLEY AND ERLE KING BAKER, OF CHICAGO, ILLINOIS, ASSIGNORS TO UNIVERSAL RIM COMPANY, OF CHICAGO, ILLINOIS, A CORPORATION OF ILLINOIS.

PNEUMATIC-TIRE MOUNTING.

1,142,516.  Specification of Letters Patent.  Patented June 8, 1915.

Continuation in part of application Serial No. 426,494, filed April 11, 1908. This application filed February 13, 1909. Serial No. 477,732.

*To all whom it may concern:*

Be it known that we, CHARLES GILBERT HAWLEY and ERLE KING BAKER, citizens of the United States, and residents of Chicago, Cook county, Illinois, have invented certain new and useful Improvements in Pneumatic-Tire Mountings, of which the following is a full, clear, and exact description, such as will enable others skilled in the art to make and use the same.

Our invention relates to improved means for mounting or securing tires upon wheels of automobiles and the like, and has especial reference to improvements in so-called demountable rims which are adapted to carry inflated tires and to be quickly mounted upon or demounted from wheels.

The object of our invention is to provide means by which so-called non-expansible and expansible tire casings may be quickly attached to or removed from automobile wheels.

Another object of the invention is to provide a mechanism by which an open or split ring, forming part of, or substantially the whole of, a wheel rim, may be quickly and powerfully expanded and contracted as required to disengage and engage and secure it upon the wheel.

Still another object of the invention is to provide an inflated tire holding rim, or a rim part, in the form of an open or split ring which shall be equipped with mechanism for locking it in either opened or contracted condition, which mechanism shall be capable of almost instant operation, to effect expansion and contraction of the rim or rim part.

A further object of the invention is to provide a demountable rim and complementary wheel which may be assembled and dismembered without detaching parts thereof, *i. e.* to provide a device which shall be free from "loose parts," by which is meant parts, without that have to be removed and replaced and are apt to be lost.

In a sense the subject matters of this present application may be said to be improvements upon the subject matter disclosed in our pending application Serial No. 426,494 filed April 11, 1908, having to do, principally, with mechanism for expanding, contracting and locking rims and rim parts of so-called split or open ring forms.

The invention consists in various novel constructions and combinations of parts all as hereinafter described and particularly pointed out in the appended claims; which will be most readily understood by reference to the accompanying drawings, forming part of this specification, and in which:—

Figure 1 is a side view of an automobile wheel constructed in accordance with, and provided with a demountable rim embodying, our invention. Figs. 2 and 3 are enlarged sectional views of the wheel felly and rim showing different methods of detachably securing the rim on the wheel. Fig. 4 is a perspective view of the rim operating mechanism. Fig. 5 is an enlarged side view thereof, in locked condition. Fig. 6 is a similar view, in opened position. Fig. 7 is a plan view of the inner side of the wheel felly and rim. Fig. 8 is a transverse section on the line $x$, $x$ of Fig. 5, viewed in the direction of the arrow 8, the locking member being omitted. Fig. 9 is a section on the line $x$, $x$ of Fig. 5 viewed in the direction of the arrow 9. Fig. 10 is a sectional view on the line $y$, $y$ of Fig. 5, showing the manner in which the locking member may if desired be rigidly secured in place. Fig. 11 is a perspective view of the locking member. Fig. 12 illustrates the operating wrench which we employ. Fig. 13 is a sectional view enlarged, on the line $z$, $z$ of Fig. 1. Fig. 14 is a side view of our expanding, contracting and locking mechanism, in modified form. Fig. 15 discloses the appearance of the gap in the felly when the tire is demounted. Fig. 16 is a sectional view on the line $u$, $u$ of Fig. 15. Fig. 17 is a plan view taken from Fig. 14. Fig. 18 is a plan view of the locking member shown in Fig. 14. Fig. 19 shows the inner side plate of the locking member. Figs. 20 and 21 are plan and side views of the lug which is attached to one end of the rim. Figs. 22 and 23 are plan and side views of the lug attached to the other end of the rim. Fig. 24 is a side view showing our invention as applied to a detachable flanged rim, commonly known as a quick detachable rim. Fig. 25 is a similar view showing the flanged rim opened, ready to be removed. Fig. 26 is a plan view, from beneath, of the parts shown in Fig. 24. Fig. 27 is a perspective view of the rim shown in Figs. 24 to 26, together with the wrench employed for the operation thereof. Fig. 28 is a sectional view on the line $v, v$ of Fig. 24. Fig. 29 is a sectional view on the line $w, w$ of Fig. 24. Fig. 30 is a sectional view on the line $t, t$ of Fig. 24. Fig. 31 is a sectional view on the line $r, r$ of Fig. 24. Fig. 32 is a similar sectional view disclosing a modified form of our quick detachable rim equipped with an operating device similar to that shown in Figs. 24 to 27. Fig. 33 is a side view of another form of our rim in which we employ a ring that interlocks with the under side of the rim and is secured thereon by expansion, contraction of the ring or flange being necessary to disengage it from the rim. Fig. 34 is a perspective view of the rim shown in Fig. 33, disclosing the complete assemblage of parts. Fig. 35 is a section similar to Fig. 9 but showing the clencher form of rim.

The devices which are shown in Figs. 1 to 23 inclusive relate to that form of our invention which is best described as a demountable rim. This rim of course is incomplete without the wheel upon which it is mounted and with which it is adapted for ready engagement as well as easy disconnection. The wheel in turn is incomplete without the rim, the latter being the agency through which the wheel is equipped with its pneumatic or cushion tire. It follows that the wheel and rim must be provided with complementary locking surfaces or interlocking parts that shall be capable of securing them in their working relations and which shall prevent accidental displacement or dislodgement. Various interlocking devices may be employed without materially influencing or affecting the essence of our invention as hereinafter disclosed, but the best three known contrivances and those which we prefer are illustrated in Figs. 1, 2 and 3. In the first instance the rim 2 which as before stated is in the form of a split or open rim and may be expanded and contracted, has a substantially inner cylindrical surface 2' that contains spaced recesses $2^3$ and the wheel has a cylindrical periphery 3 which is provided with correspondingly spaced projections 3'. When the rim is placed on the wheel these projections interlock and serve to prevent lateral movement of the rim on the wheel. In the second instance we provide the inner surface of the rim with either a plurality of projections or a continuous rim $2^5$ which fits into a series of sockets or a continuous groove $3^3$ in the periphery of the wheel. In the third instance the rim itself is provided with a groove $2^4$ which fits and receives either all or a part of the rim $3^4$ of the wheel. Our wheel A is preferably provided with a felly band B which is shrunk thereon. This felly band presents the periphery before alluded to and the projections 3' may be the heads of certain of the felly band bolts by which the band B is secured on the felly A' of the wheel.

C represents a pneumatic tire mounted in or on the rim. It will be understood that the valve stem C' extends through the rim 2, the felly band B and the felly of the wheel and assists in preventing either lateral or rotary movement of the rim on the wheel. The split or opening $2^a$ in the rim is preferably made at a point diametrically opposite the valve stem C'. While this is the desirable construction our invention is not limited thereto and the valve stem may quite as well be placed at another point and may be very conveniently located at one end of the rim adjacent to or directly in the split or gap in the rim. Our rim is so constructed that it is capable of being expanded, and when expanded its diameter is so increased that the interlocking parts no longer engage and the rim may be freely placed upon or removed from the wheel. When contracted either intentionally or by the pressure of the pneumatic tire the rim snugly hugs the periphery of the wheel and forcibly engages the interlocking parts. Another feature of our construction as better explained hereinafter, is that the rim while on the wheel is at all times free to contract for the purpose of taking up irregularities or wear between the rim and the wheel. As a measure of safety we do not depend upon either the natural resilience of the rim or the contracting effect of the tire thereon but employ a mechanism by which the ends of the rim may be fastened after the rim is contracted on the wheel. This mechanism serves to prevent such expansion as would permit the rim to escape from the wheel, but does not prevent the contraction which is necessary to take up wear. To support the tire shoe and the inner tube therein we use in the channel of the rim a light bridge plate D, which bridges the gap between the ends of the rim. This plate D, as shown in Figs. 5, 6, 7, 8 to 13, need not be attached to either end of the rim. It conforms to the shape of the latter, being of clencher form in a clencher rim, and of U-shaped or channel form for rims of the kind shown in Figs. 1, 8 to 13. The locking device alluded to comprises four principal members, to wit, the locking member, hook or link $e$, the lugs $f$ and $g$ and the operating link or wrench $h$.

Referring to Figs. 1, 4 to 12, it will be noted that the lugs $f$ and $g$ are permanently attached to or formed upon the ends of the rim and preferably on the inner surfaces thereof. The lug $f$ contains a slot $f'$ in which the pintle $e'$ of the member $e$ is movable. The lug $g$ comprises a head $g'$ and the fin or narrower part $g^2$. The head $g'$ has curved locking surfaces which co-act with the free end of the member E. The member E as best shown in Figs. 5, 6, 7, 10 and 12 is in the form of a two-sided hook which straddles the lug $f$ and the fin $g^2$ of the lug $g$. The substantially cylindrical end $e^2$ of the hook is also bifurcated to straddle the fin $g^2$, as shown in Fig. 6. The lug $g$ and the end of the hook contain the holes $g^3$ and $e^3$. Because of the peculiar shapes of these parts the centers of the holes are separated by a substantially constant distance during the time that the end of the hook is rotated around the end of the lug $g$. For thus rotating the hook and shifting it from one side to the other of the lug we employ a temporary link or wrench $h$ having two studs or legs $h'$ and $h''$ which may be inserted in the holes $g^3$ and $e^3$. The wrench has a handle $h^3$ of any suitable form by which it may be turned, and as the wrench has great leverage the hook member $e$ may be forcedly turned or exchanged from side to side of the lug $g$ on the rim. By shifting it to the position shown in Fig. 5 the ends of the rim are drawn together, whereas the opposite movement causes the expansion or opening of the rim. The lost motion represented by the pintle and the slot in the lug $f$ takes up part of the movement of the member $e$ so that the rim is not too greatly distended. The extent of this lost motion, in practice, depends upon the nature of the tire to be mounted in the rim and the differences of radius observable in the rim and wheel interlocking devices, whatever their kind. A special advantage of this structure is that the operating part, namely the link or wrench, may be quickly applied and turned to either open or close the rim, and when its work is done may be removed, the two lugs and the hook member constituting the complete locking and operating device except at times of an exchange of rims. And this locking device may be applied at the edge of the rim, but to prevent distortion of the rim when not on the wheel, and when held expanded under the pressure of an inflated tire, we prefer to set the locking device more nearly at the center of the rim, as shown in Fig. 7, providing the wheel felly with a notch $b^2$ to receive it. The hook end passes centers with the lugs on the rim ends, and the device is therefore self-locking in both positions. However the initial contracting strain on the rim necessary to lock it, as shown in Fig. 5, may not take all of the stretch out of the rim, and from this cause or from wear between the parts the hook and the lug $g$ might ultimately become loose. Should this happen some accidental force might throw back the hook and disconnect the ends of the rim. To avoid such a contingency we preferably provide the fin $g^2$ with a threaded hole $g^4$, and in the inner side of the member $e$ provide a larger hole $e^4$ to receive a threaded bolt $i$ which extends through a hole $B''$ in the felly B. This bolt can only be put in place after the parts are in the position shown in Fig. 5. And when positioned as in Figs. 7 and 10 serves to at once bind the whole locking contrivance against the felly and support the member $e$ in locked position on the lug $g$. The shank $i'$ of the bolt is smaller than its thread. The bolt is passed through a hole in the plate $B^3$ on the felly, which hole is either threaded or is collapsed after the bolt is positioned. The bolt may be drawn back until its thread strikes the inner side of the plate $B^3$ but cannot otherwise be shifted and cannot easily detached from the wheel. This prevents its loss. The head of the bolt is square, and one end of the wrench $h$ is provided with a socket $h^4$ to fit the bolt head. It follows that one tool is all that is required to operate our demountable rim.

In many cases we find the structure shown in Figs. 14 to 23 preferable to the hereinbefore described locking device. So far as the locking device itself is concerned it is the same in principle but it takes less room and is of less weight. Furthermore instead of simply cutting a notch in the sides of the wheel felly we here form the notch of such depth that the locking device may be at the middle of the rim, $i.$ $e.$ within the middle plane of the rim. In Figs. 14 and 15 $2^x$ represents the wheel felly which contains a notch or recess deep enough to receive the casting or forging J. This is in the form of an open sided box also open at the top or periphery. It fills the space in the felly and gives the felly requisite strength. It does something more. It constitutes a part of the metal tire $B^x$, which latter instead of being a welded ring is simply a piece of flat steel rolled up to form and size with its ends secured to the boxing J by means of rivets $B^{x'}$. The surface $J'$ of the boxing is coincident with the remainder of the band or tire $B^x$. The boxing is preferably shouldered to receive the ends and if desired the ends may be brazed or electrically welded to the boxing. In either form described the boxing is preferably interposed in and made a part of the metal tire before the latter is shrunk or otherwise fastened on the felly.

$J^2$ is a hole formed or drilled in the side of the boxing and the felly to admit a bolt, not shown, that may be used for fastening the hook of the locking device.

$2^a$, $2^a$ represent the ends of the heretofore described demountable rim, and $F^a$ and $G^a$ lugs somewhat like those before described. Both lugs may have integral riveting studs, as shown in Figs. 20 to 23. In practice these are riveted in holes in the rim ends and are then brazed. The lugs may be electrically welded to the rim ends. The locking member or hook is preferably formed of the two side pieces E⁵ and E⁶, the pintle E⁷, the tube E⁸ and the strengthening rivet E⁹. These parts when first put together are riveted, and the whole device is then dip brazed or welded, making it as though a single piece. The outer side E⁶ is in the form of a hook as it must not interfere with the use of the wrench in the two holes G^b and E^{s'}, but the inner side E⁵ may extend straight across from the pintle portion to the part E⁸. If desired this part E⁵ may contain a hole like the hole E⁴ and a final fastening bolt may be used therein after the manner shown in Fig. 10. It will be noted that the ends of the parts E⁵ and E⁶ are larger than the tube E⁸ and that these parts straddle or overlap the sides of the lug G^a. This connection prevents relative sidewise motion of one part on the other. In order that the lug shall have a surface flush with the side of the locking member it is preferably provided with an annular boss G^c around the hole G^b. When a wrench is used on this fastening it operates in the manner hereinbefore described. Most users prefer to put a common bolt through the hole E^{s'} and the hole J², but racers who wish to save time will prefer the non-losable fastener which comprises the short bolt or screw K and a swiveled block or gib K' adapted to press against the locking member between its sides. Such a device prevents side shifting between the wheel felly and the rim and also fastens the locking mechanism in locked condition.

The description has thus far related to demountable rims. We now desire that it shall be understood that our locking mechanism is admirably adapted for use upon the detachable flanges on tire rims for so-called quick detachable tires. Such a device is shown in Figs. 24 to 27. The rim L with its edge groove L' is of ordinary form. The reversible side flange M is of common cross section, and this side flange is a split ring, see Fig. 24, and as a means of quickly opening and closing the ring we employ a wrench operated power expander comprising the link or strap m pivoted to one end of the ring M and having a round T-head m' that co-acts with the bifurcated lug m''. A wrench similar to that before described, having pins which enter the holes m³ and m⁴ is used for operating the device to open and close the ring, as shown in Figs. 24 and 25. A stiff spring M' carried by the ring M adjacent to lug m'' serves to retain the end of the link when moved into locking position. The whole locking contrivance is no wider than the ring. It may be accommodated either by a notch in the edge of the rim as shown in Fig. 27, or in a slot M'' provided in said edge, as shown in Fig. 26. In lieu of or in addition to the spring M' we may use a small locking screw m⁵ in the lug m'', the same having an end which enters a hole in the link. No lost motion need be allowed for between the pivoted end of the link and the ring as it is desirable to use the full throw of the operating device and open the ring widely as in Fig. 25 to facilitate the quick removal. All of the parts which are actually needed for proper operation show in Fig. 27. The spring and the locking screw may be safely dispensed with though ordinarily used.

The device illustrated in Fig. 32 operates in the same manner as those in Figs. 24 to 27. The only purpose of this figure of the drawing is to show the readiness with which our rim may be adapted to channel form rims of the kind generally illustrated in Figs. 8, 9, 10, 13. It will be noted that we provide the rim B² with a narrow groove B^{z'} just wide enough to receive the edge of the split ring or flange N. This latter has a curved outwardly bent flange N' conforming to the flange B^{z''} on the other edge of the rim. When the ring N is expanded by means of the operating device M^a it may be readily unseated from the rim; and obviously may be quite as readily replaced. This detachable flange may, with ease, be employed, in fact any of the forms of our detachable flanges may easily be employed and combined for conjoint use with the demountable rim invention hereinbefore described.

A still further form of our invention appears in Figs. 33 and 34, in which case the detachable flange O having inwardly and upwardly turned edge which co-acts with the down turned flange B^{y'} on the rim B^y. The flanges of this rim may be of either clencher or channel form. The ring or flange O is open at a point O'. One end is provided with ears O² and is bifurcated to receive the end of the link P. The remainder of the device, i. e. the lug O³ and the head or end P' of the link are the same as before described. This device is operated by a wrench like that shown in Figs. 4, 12 and 37. Fig. 34 illustrates the working condition of the parts, the link in this case serving to brace apart the ends of the ring and thus hold it in expanded engagement with the flange B^{y'} of the rim. Fig. 33 illustrates the non-working or detached or unlocked positions of the parts. A further or safety fastening may be provided if desired, but none is required. With this form of our invention we prefer to use a bridge plate to close the gap in the expanded ring.

As various modifications of our invention will readily suggest themselves to one skilled in the art we do not limit or confine the invention to the specific structures herein shown and described.

This application is a continuation of our application Serial Number 426,494, filed April 11, 1908, now Patent No. 915,954, granted March 23, 1909, and of our application 481,360, filed March 5, 1909, which was a division of said application, Serial Number 426,494, the latter having been abandoned in favor of the present application.

Having thus described our invention we claim as new and desire to secure by Letters Patent:

1. A demountable wheel rim comprising a split ring, in combination with a link having a pin and slot connection to one end of the ring, and a lug on the other end of the ring, the free end of the link being interlockable with said lug in two positions, substantially as described.

2. In a vehicle wheel rim, in combination, a fixed member, a split detachable rim member carrying tire retaining means, a latch connected to one end of the split member and movable with relation thereto in the plane of the wheel, and means for holding said latch in engagement with the other end of the split member.

3. In a vehicle wheel rim in combination, a fixed member, a split detachable rim member, carrying tire retaining means, a latch pivoted to one end of said split member by means of a pivot whose axis is substantially parallel to that of the wheel, a lug on the other end of said split member adapted to be engaged by said latch, and means for holding said latch in engagement with said lug.

In testimony whereof, we have hereunto set our hands, this 30th day of January, 1909, in the presence of two subscribing witnesses.

CHARLES GILBERT HAWLEY.
ERLE K. BAKER.

Witnesses:
ARTHUR LIPSCHUTZ,
JOHN R. LEFEVRE.